(12) United States Patent
Guo et al.

(10) Patent No.: US 12,288,382 B2
(45) Date of Patent: Apr. 29, 2025

(54) MACHINE LEARNING METHOD FOR CONTINUAL LEARNING AND ELECTRONIC DEVICE

(71) Applicant: Wistron Corporation, New Taipei (TW)

(72) Inventors: Jiun-In Guo, Hsinchu (TW); Cheng-Fu Liou, New Taipei (TW)

(73) Assignee: Wistron Corporation, New Taipei (TW)

( * ) Notice: Subject to any disclaimer, the term of this patent is extended or adjusted under 35 U.S.C. 154(b) by 477 days.

(21) Appl. No.: 17/951,043

(22) Filed: Sep. 22, 2022

(65) Prior Publication Data

US 2023/0410481 A1    Dec. 21, 2023

(30) Foreign Application Priority Data

Jun. 17, 2022   (TW) .................................. 111122622

(51) Int. Cl.
*G06V 10/774* (2022.01)
*G06V 10/32* (2022.01)
*G06V 10/77* (2022.01)
*G06V 10/776* (2022.01)
*G06V 10/82* (2022.01)

(52) U.S. Cl.
CPC ............ *G06V 10/774* (2022.01); *G06V 10/32* (2022.01); *G06V 10/7715* (2022.01); *G06V 10/776* (2022.01); *G06V 10/82* (2022.01)

(58) Field of Classification Search
CPC ........ G06N 3/0464; G06N 3/084; G06N 3/09; G06V 10/32; G06V 10/7715; G06V 10/774; G06V 10/776; G06V 10/82
See application file for complete search history.

(56) References Cited

U.S. PATENT DOCUMENTS

| 9,826,149 B2 | 11/2017 | Chalom et al. |
| 2016/0284095 A1 | 9/2016 | Chalom et al. |
| 2019/0114544 A1* | 4/2019 | Sundaram .............. G16B 20/20 |

(Continued)

FOREIGN PATENT DOCUMENTS

| CN | 113239974 | 8/2021 |
| TW | I620441 | 4/2018 |
| WO | 2021143883 | 7/2021 |

OTHER PUBLICATIONS

"Office Action of Taiwan Counterpart Application", issued on Mar. 14, 2023, p. 1-p. 6.

(Continued)

*Primary Examiner* — Manuchehr Rahmjoo
(74) *Attorney, Agent, or Firm* — JCIPRNET

(57) ABSTRACT

A machine learning method for continual learning is provided, and the method includes following steps. Capturing an input image. Performing feature extraction on the input image by a plurality of sub-models to obtain a plurality of feature maps, where the sub-models correspond to a plurality of tasks, and the sub-models are determined by a neural network model and a plurality of channel-wise masks. Converting the feature maps into a plurality of energy scores. Selecting a target sub-model corresponding to a target task of the tasks from the sub-models according to the energy scores. Outputting a prediction result corresponding to the target task by the target sub-model.

18 Claims, 10 Drawing Sheets

(56) References Cited

U.S. PATENT DOCUMENTS

2021/0209514 A1 7/2021 Kim et al.
2022/0351019 A1 11/2022 Chen et al.

OTHER PUBLICATIONS

Shin'ichi Shirakawa, "One-Shot Neural Architecture Search Based on the Natural Gradient of Probability", Communications of the Operations Research Society of Japan, Jun. 1, 2021, with English translation thereof, pp. 381-386, vol. 6, No. 6.
Maruki Kawashima et al., "A Continual Reinforcement Learning Method Handling Multiple Input and Output Sizes", The 25th Game Programming Workshop 2020, Nov. 6, 2020, with English abstract, pp. 161-168, vol. 2020.
Mohamed Shahawy et al., "Exploring the Intersection between Neural Architecture Search and Continual Learning", retrieved from arXiv database, arXiv:2206.05625 [cs.AI], Jun. 15, 2023, pp. 1-21.
"Search Report of Europe Counterpart Application", issued on Aug. 22, 2023, p. 1-p. 11.

Rahaf Aljundi et al., "Gradient based sample selection for online continual learning", 33rd Conference on Neural Information Processing Systems, Oct. 31, 2019, pp. 1-13.
Rahaf Aljundi et al., "Task-Free Continual Learning", IEEE International Conference on Computer Vision and Pattern Recognition, Aug. 19, 2019, pp. 1-14.
Soochan Lee et al., "A Neural Dirichlet Process Mixture Model for Task-Free Continual Learning", International Conference on Learning Representations, Jan. 14, 2020, pp. 1-22.
Davide Abati et al., "Conditional Channel Gated Networks for Task-Aware Continual Learning", IEEE International Conference on Computer Vision and Pattern Recognition, Mar. 31, 2020, pp. 1-13.
Xisen Jin et al., "Gradient Based Memory Editing for Task-Free Continual Learning", Advances in International Conference on Machine Learning, Jun. 27, 2020, pp. 1-12.
Cheng-Fu Liou et al., "Residual Knowledge Retention for Edge Devices", 2021 IEEE 30th International Symposium on Industrial Electronics (ISIE), Jun. 20-23, 2021, pp. 1-6.

* cited by examiner

MACHINE LEARNING METHOD FOR CONTINUAL LEARNING AND ELECTRONIC DEVICE

CROSS-REFERENCE TO RELATED APPLICATION

This application claims the priority benefit of Taiwan patent application no. 111122022, filed on Jun. 17, 2022. The entirety of the above-mentioned patent application is hereby incorporated by reference herein and made a part of this specification.

BACKGROUND

Technical Field

The disclosure relates to a machine learning technology; more particularly, the disclosure relates to a machine learning method and an electronic device configured for task-aware continual learning.

Description of Related Art

The explosive growth of artificial intelligence (AI) in recent years has significantly changed lives of human beings. As the AI technology continues to advance, various application areas (e.g., autonomous drones, mechanical surgery, medical diagnosis and treatment) are required to support continuous (or continual) or life-long learning, which is the so-called "never-ending" learning. A life-long learning system concentrates on efficient transfer and use of knowledge which has been learned for new tasks and may manage a plurality of tasks in sequence. In the related art, the method applied for complying with said requirement refers to "joint learning", i.e., the training data of all tasks are simultaneously obtained and jointly optimized. However, according to the joint learning technology, as the number of tasks increases, the data of new tasks are diluted by the data of previous tasks, and the training time is also prolonged with the increase of the amount of data. In addition, in the application scenarios such as face recognition, the data of human faces in the previous tasks are likely no longer accessible and re-trainable due to privacy concerns.

In order to allow AI to accumulate knowledge like human brains, continual learning has been developed to focus on the effective transfer and use of learned knowledge in new tasks and processing of the tasks in sequence, while an issue of "catastrophic forgetting" caused by inability to access the previous data should be prevented. Continuous learning methods may be divided into three main categories, i.e., experience replay, polarization regularization term, and dynamic network isolation. In the existing continual learning technology based on polarization regularization term, even though the data of the previous task are not provided, after learning a new task, the hardly ignorable issue of catastrophic forgetting of the knowledge of the previous task may still arise. By contrast, the phenomenon of catastrophic forgetting is relatively minor in experience replay which provides the new task with the previous data of the previous task and assists in learning the new task. However, if it is difficult or store the previous data due to privacy issues, the subsequent update of the model may be negatively affected. As to dynamic network isolation, the number of parameters and the data amount of models increase proportionally with the increase of tasks, which consumes a number of computing resources and may not alleviate the burden n on users.

The existing continual learning often operates in a task-based sequential learning setup, which is rarely encountered in practical applications. Hence, task-free continual learning begins to be developed to resolve said issue. According to the related art, task-free continual learning often requires experience reply, and the learning process relies on the confidence of the Softmax function for comparison and scoring. However, the neural network may overfit in the sample space and thus gives a high degree of confidence to the samples of an unlearned class, thus resulting in poor performance of cross-task accuracy of subsequent calculations.

SUMMARY

The disclosure provides a machine learning method and an electronic device for continual learning, which may effectively prevent catastrophic forgetting and simultaneously achieve effects of self-adaptively identifying a target task from a plurality of tasks.

An embodiment of the disclosure provides a machine learning method for continual learning, and the method includes following steps. Capturing an input image. Performing feature extraction on the input image by a plurality of sub-models to obtain a plurality of feature maps, wherein the sub-models correspond to a plurality of tasks, and the sub-models are determined by a neural network model and a plurality of channel-wise masks. Converting the feature maps into a plurality of energy scores. Selecting a target sub-model corresponding to a target task of the tasks from the sub-models according to the energy scores. Outputting a prediction result corresponding to the target task by the target sub-model.

In an embodiment of the disclosure, the machine learning method further includes following steps. Receiving training data associated with the tasks, wherein the training data comprise a training image and a class label corresponding to the training image. Performing the feature extraction on the training image according to the neural network model and the channel-wise masks to obtain a training feature map. Converting the training feature map into a feature energy score. Determining a loss function according to the class label, the channel-wise masks, and the feature energy score. Determining a backward propagation gradient according to the loss function. Updating the neural network model and the channel-wise masks according to the backward propagation gradient, wherein the channel-wise masks correspond to the tasks, and a channel-wise mask of the channel-wise masks corresponding to at least one training task of the tasks is updated.

In another aspect, an embodiment of the disclosure provides an electronic device configured for task-aware continual learning, and the electronic device includes a storage medium storing a plurality of modules, and a processor coupled to the storage medium and configured to execute the modules. Here, the modules include an image capturing module capturing an input image and an inference module performing feature extraction on the input image by a plurality of sub-models to obtain a plurality of feature maps, wherein the sub-models correspond to a plurality of tasks, the sub-models are determined by a neural network model and a plurality of channel-wise masks, the feature maps are converted into a plurality of energy scores, a target sub-model corresponding to a target task of the tasks is selected from the sub-models according to the energy scores, and a prediction result corresponding to the target task is output by the target sub-model.

In an embodiment of the disclosure, the modules further include a training module receiving training data associated with the tasks, wherein the training data include a training image and a class label corresponding to the training image; performing the feature extraction on the training image according to the neural network model and the channel-wise masks to obtain a training feature map; converting the training feature map into a feature energy score; determining a loss function according to the class label, the channel-wise masks, and the feature energy score; determining a backward propagation gradient according to the loss function; and updating the neural network model and the channel-wise masks according to the backward propagation gradient, wherein the channel-wise masks correspond to the tasks, and a channel-wise mask of the channel-wise masks corresponding to at least one training task of the tasks is updated.

In view of the above, one or more embodiments of the disclosure provide the task-aware continual learning mechanism based on energy scores, the feature maps corresponding to a plurality of tasks are classified by the channel-wise masks in the neural network model to determine the sub-models, the neural network model together with the channel-wise masks corresponding to the previously learned tasks is allowed to automatically determine whether a neural network parameter important to other previous tasks is applied again according to the loss function, and the neural network parameter is applied to optimize a new task, so that the neural network model may have an improved re-utilization rate. Thereby, the neural network model is allowed to keep more neurons for learning the next task, and important parameters in the sub-models may be preserved, so as to further effectively prevent catastrophic forgetting.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF THE EMBODIMENTS

Figure 1:
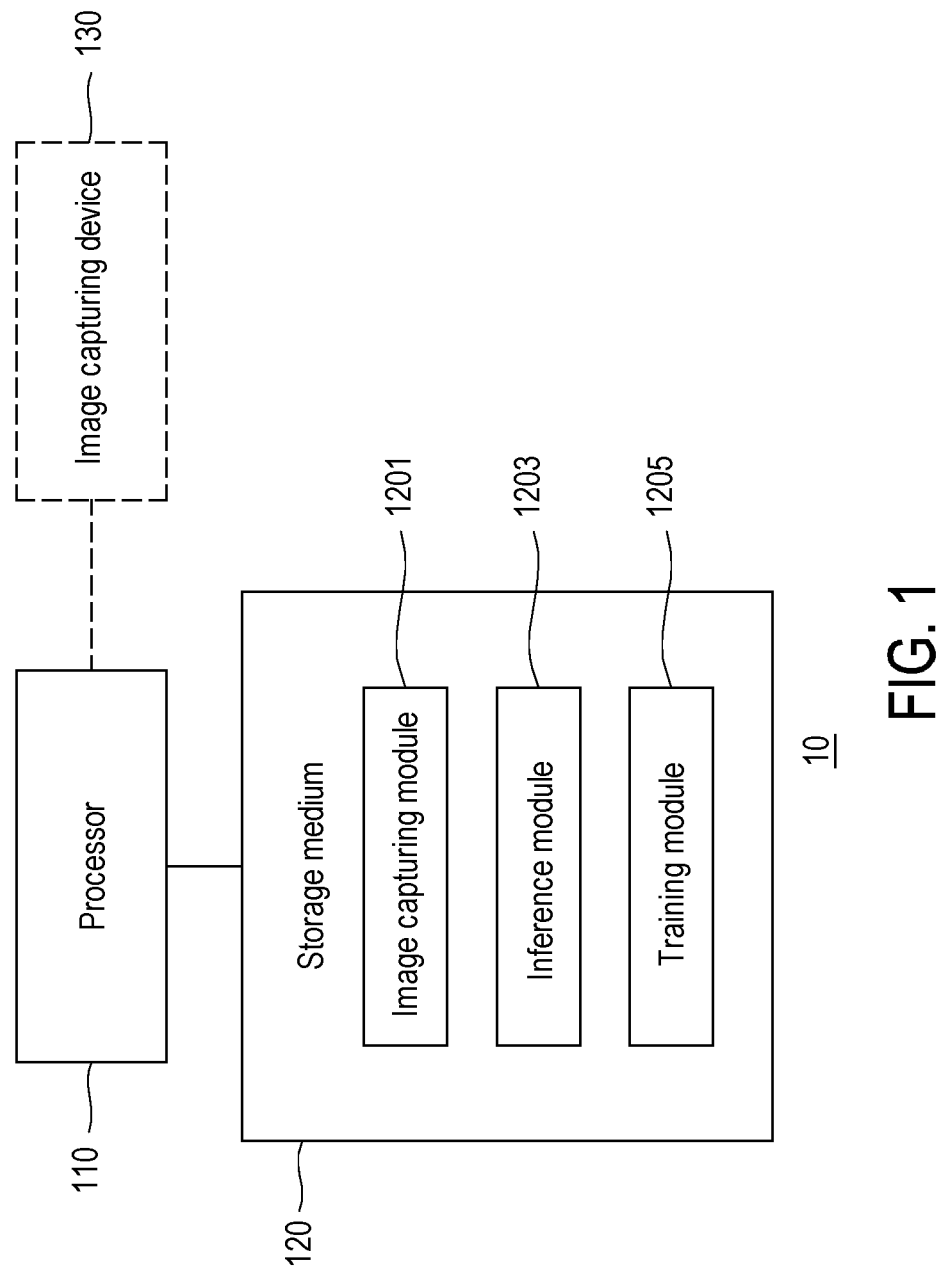
FIG. 1 is a schematic view of an electronic device according to an embodiment of the disclosure.

Some embodiments provided in the disclosure will be described in detail with reference of the accompanying drawings. The reference numbers in the following description are regarded as directing to the same or similar elements when the same reference numbers appear in different drawings. These embodiments are only a part of the invention, and not all of the possible implementations of the invention are disclosed. To be more precise, these embodiments serve as examples of methods and devices within the scope provided in the claims. Moreover, wherever possible, elements/components/steps with the same reference numbers in the drawings and the embodiments denote the same or similar parts. Cross-reference may be made to related descriptions of elements/components/steps marked by the same reference numbers or the same terminologies in different embodiments.

FIG. 1 is a schematic view of an electronic device according to an embodiment of the disclosure. The electronic device 10 includes a processor 110 and a storage medium 120. The electronic device 10 may be an edge calculation device. The electronic device 10 may be an edge calculation device implemented on an embedded platform, and the electronic device 10 may be an image recognition device applied in various scenarios, such as human face recognition, access control, identity verification, digital surveillance, financial industry, retail industry, unmanned stores, smart factories, drones, mechanical surgery, medical diagnosis, and so on. The electronic device 10 may also be a desktop computer, a notebook computer, a server, a smart phone, or a tablet computer, and the model number, the brand, and the operating system of the electronic device 10 should not be construed as a limitation in the disclosure.

The processor 110 is, for instance, a central processing unit (CPU) or another general-purpose or special-purpose programmable micro control unit (MCU), microprocessor, digital signal processor (DSP), programmable controller, application specific integrated circuit (ASIC), graphics processing unit (GPU), tensor processing unit (TPU), image signal processor (ISP), image processing unit (IPU), arithmetic logic unit (ALU), complex programmable logic device (CPLD), field programmable gate array (FPGA), or other similar elements or a combination of the above elements. The processor 110 may be coupled to the storage medium 120 and access and execute a plurality of modules or various application programs stored in the storage medium 120.

The storage medium 120 is, for instance, any type of fixed or movable random access memory (RAM), read-only memory (ROM), flash memory, hard disk drive (HDD), solid state drive (SSD), or similar components or a combination of the above components and is configured to store a plurality of modules, computer programs, or various application programs executable by the processor 110. In this embodiment, the modules stored in the storage medium 120 include an image capturing module 1201, an inference module 1203, and a training module 1205, the functions of which are described below.

In an embodiment, the electronic device 10 may further include an image capturing device 130. The processor 110 may be coupled to the image capturing device 130. The image capturing device 130 is, for instance, a digital camera, a camcorder, or a camera lens having a lens and a photosensitive element. The photosensitive element serves to sense the intensity of light entering the lens, thereby generating an image.

Figure 2:
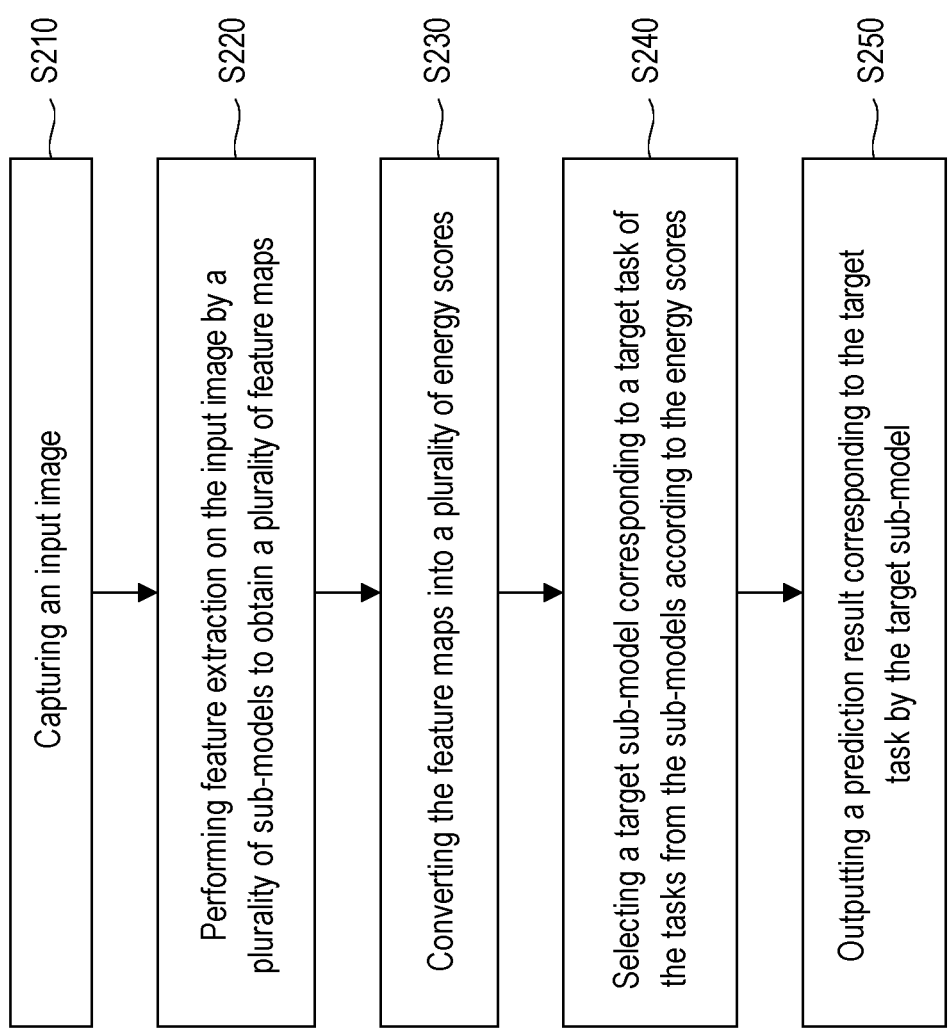
FIG. 2 is a flowchart of an inference stage in a machine learning method according to an embodiment of the disclosure.

FIG. 2 is a flowchart of an inference stage in a machine learning method according to an embodiment of the disclosure. The machine learning method depicted in FIG. 2 is applicable to the electronic device 10 depicted in FIG. 1. Please refer to both FIG. 1 and FIG. 2.

In step S210, the image capturing module 1201 captures an input image. For instance, the image capturing module 1201 captures an input image through the image capturing device 130, captures an input image from a database, or receives an input image from the Internet.

In step S220, the inference module 1203 performs feature extraction on the input image by a plurality of sub-models to obtain a plurality of feature maps. Concretely, feature extraction refers to the process of transforming raw data into numerical features that can be processed while preserving the information in the original data set. For example, feature extraction for image data represents the interesting parts of an image as a numerical feature vector or a feature matrix, also known as a feature map. Each sub-model extracts input image features from the input image and represents the image features as a feature map. The feature map may be represented as but not limited to a set of numerical data, a data vector, or a data matrix. Note that the sub-models correspond to a plurality of tasks, and the sub-models are determined by a neural network model and a plurality of channel-wise masks in the neural network model. In step S230, the inference module 1203 converts the feature maps into a plurality of energy scores. In step S240, the inference module 1203 selects a target sub-model corresponding to a target task of the tasks from the sub-models according to the energy scores. In step S250, the inference module 1203 outputs a prediction result corresponding to the target task by the target sub-model.

Figure 3:
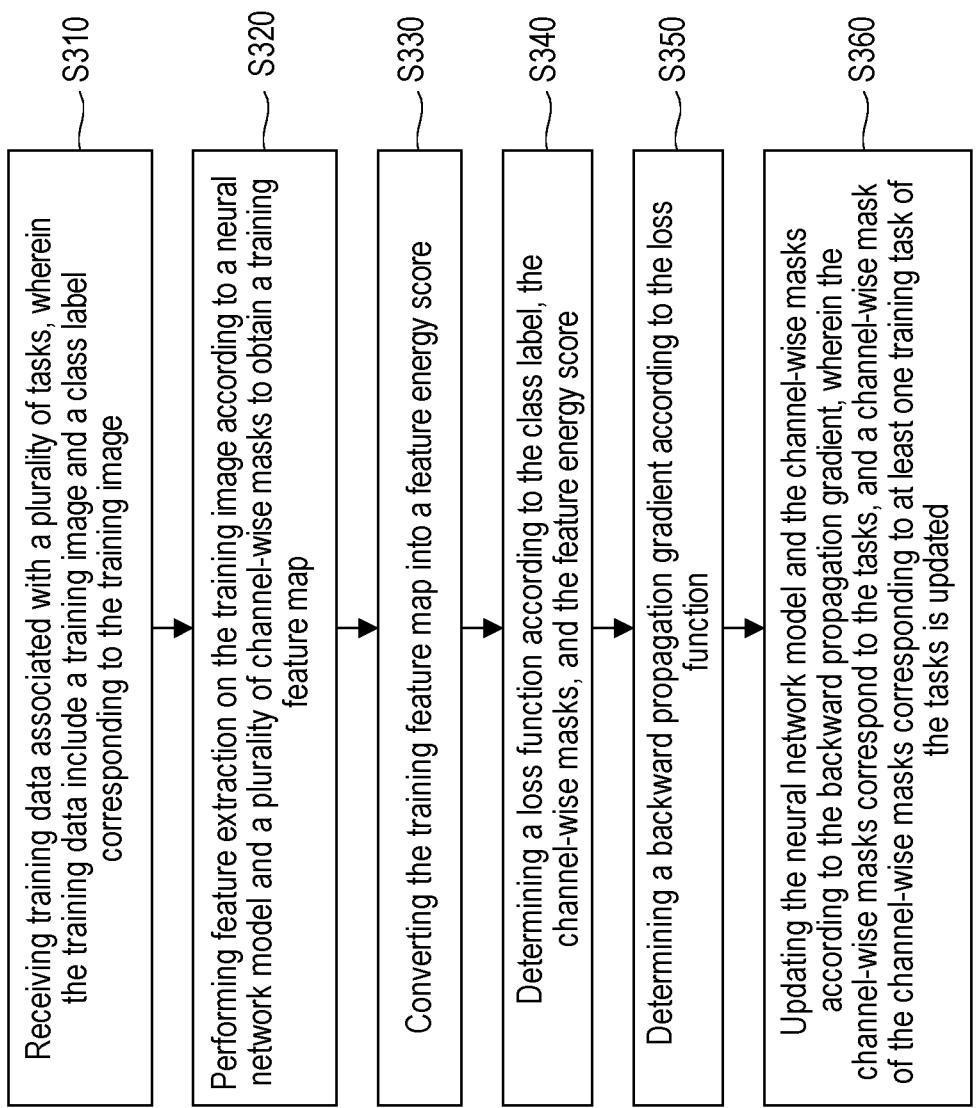
FIG. 3 is a flowchart of a training stage in a machine learning method according to an embodiment of the disclosure.

FIG. 3 is a flowchart of a training stage in a machine learning method according to an embodiment of the disclosure. The machine learning method depicted in FIG. 3 is applicable to the electronic device 10 depicted in FIG. 1. Please refer to both FIG. 1 and FIG. 3. In step S310, the training module 1205 receives training data associated with a plurality of tasks. The training data include a training image and a class label corresponding to the training image. The class label may correspond to a training task of the tasks. In step S320, the training module 1205 performs feature extraction on the training image according to a neural network model and a plurality of channel-wise masks to obtain a training feature map. In step S330, the training module 1205 converts the training feature map into a feature energy score. In step S340, the training module 1205 calculates to obtain a loss function according to the class label, the channel-wise masks, and the feature energy score. A numerical value of the loss function may be calculated according to a realization of the class label, the channel-wise masks, and the feature energy score from a sample of the training data. In step S350, the training module 1205 determines a backward propagation gradient according to the loss function. For example, the backward propagation gradient is determined by calculation result of the numerical value of the loss function in step S340. Concretely, the backward propagation gradient refers to the gradient of the loss function, which points towards the direction of the value that minimizes the loss function. For a neural network, backward propagation gradient refers to the gradient of the loss function computed by backpropagation with respect to the weights of each layer of the neural network. In step S360, the training module 1205 updates the neural network model and the channel-wise masks according to the backward propagation gradient, wherein the channel-wise masks correspond to the tasks, and a channel-wise mask of the channel-wise masks corresponding to at least one training task of the tasks is updated.

For instance, the electronic device 10 may apply the same neural network model to perform continual learning on a plurality of tasks 1, 2, . . . , and t, respectively. The channel-wise masks may correspond to the tasks 1, 2, . . . , and t, respectively. In an embodiment, when a training task is the task t, the training module 1205 receives training data associated with the task t, and the training data include a training image associated with the task t and a class label corresponding to the training image. The class label may correspond to the class of the task t (step S310). The training module 1205 obtains a training feature map according to the neural network model and a channel-wise mask of the channel-wise masks corresponding to the task t by performing feature extraction on the training image (step S320). The training module 1205 converts the training feature map into a feature energy score (step S330). The training module 1205 calculates to obtain a loss function according to the class label, the channel-wise mask of the channel-wise masks corresponding to the task t, and the feature energy scores (step S340). A numerical value of the loss function may be calculated according to a realization of the class label, the channel-wise masks corresponding to the task t, and the feature energy score from a sample of the training data associated with the task t. The training module 1205 determines a backward propagation gradient of the channel-wise mask of the channel-wise masks corresponding to the task t according to the loss function (step S350). For example, the backward propagation gradient is determined by calculation result of the numerical value of the loss function in step S340. The training module 1205 updates the neural network model and the channel-wise mask of the channel-wise masks corresponding to the task t according to the backward propagation gradient (step S360). Therefore, after the electronic device 10 have learned the tasks 1, 2, . . . , and t, the channel-wise masks may classify the same neural network model into a plurality of sub-models corresponding to the tasks 1, 2, . . . , and t.

It is worth mentioning that the execution order of the inference stage illustrated in FIG. 2 and the training stage illustrated in FIG. 3 is not limited in the disclosure. In an embodiment, the tasks include training data of a new task. The electronic device 10 may first execute steps in the training stage shown in FIG. 3 to learn the new task. When the electronic device 10 completes the training stage for the new task, the steps in the inference stage shown in FIG. 2 are performed to predict an input image according to and the channel-wise masks and the neural network model that has been trained on the new task. In an embodiment, the electronic device 10 may perform the steps in the inference stage depicted in FIG. 3 according to a pre-stored neural network model that has completed pre-training on the tasks and the channel-wise masks corresponding to the neural network model. When there is a new task in the tasks, the electronic device 10 performs training according to the training data of the new task and updates the neural network model and a channel-wise mask of the channel-wise masks corresponding to the new task. Therefore, the electronic device 10 provided in one or more embodiments of the disclosure may perform continual learning on a plurality of tasks by applying one neural network to achieve the function of capturing features of plural tasks, perform task-based sequential learning on the training data of a specific task to achieve the effect of leaning the new task without forgetting the previous tasks, and alleviating the restriction of the conventional continual learning method where the tasks should be manually assigned.

In an embodiment, the neural network model includes at least one convolutional layer and at least one batch normalization layer. In an embodiment, the neural network model may be a convolutional neural network architecture, which is, for instance, a neural network architecture of ResNet, VGG, or MobileNet-v2. The electronic device 10 is, for instance, an edge calculation device. In general, there are many limitations to the memory capacity and the calculation capabilities of the edge calculation device, and the conventional joint learning is often not allowed. With the machine learning provided in one or more embodiments of the disclosure, among the input data of the tasks, a target task is automatically determined without changing the neural network architecture, so as to achieve continual learning through successive training on a small portion of the data. For the edge calculation devices with less powerful hardware specifications, deep network learning may be performed according to one or more embodiments of the disclosure in a more power-saving and faster manner.

Figure 4:
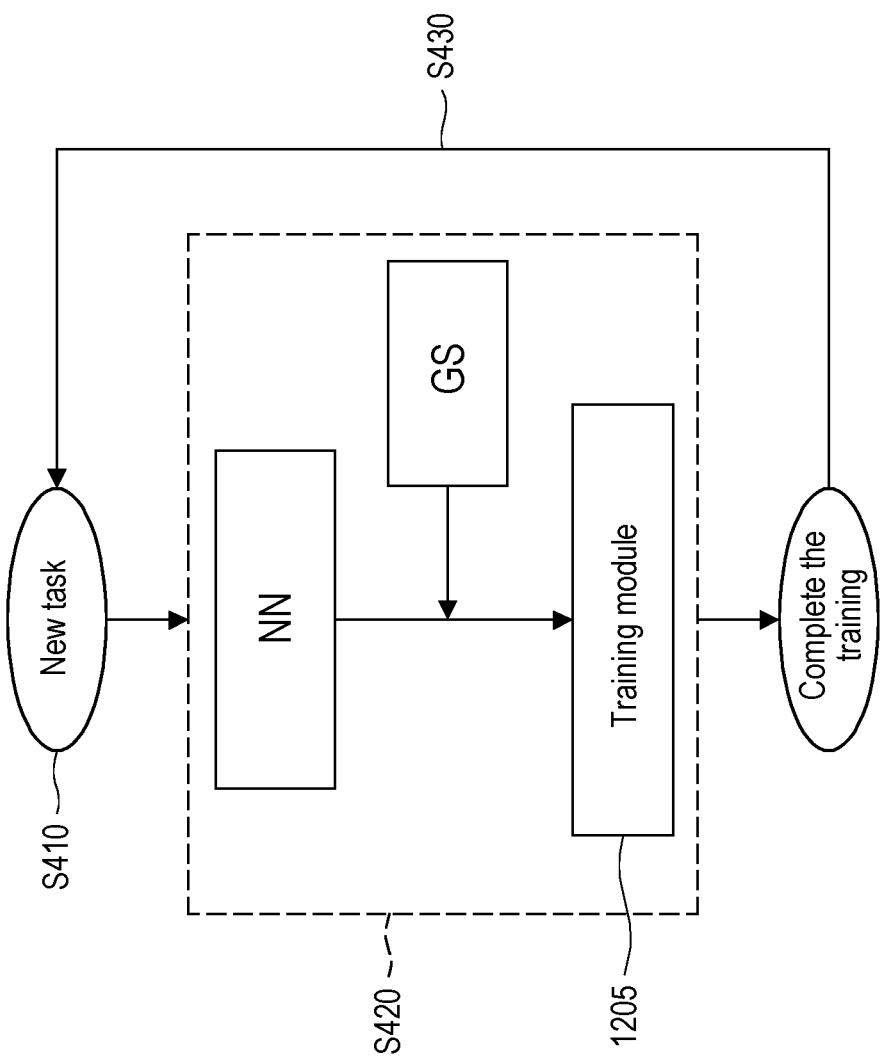
FIG. 4 is a schematic view illustrating a training module is learning a new task according to an embodiment of the disclosure.

FIG. 4 is a schematic view illustrating a training module is learning a new task according to an embodiment of the disclosure. With reference to FIG. 4, in step S410, the electronic device 10 receives training data of a new task. In step S420, the training module 1205 executes the steps illustrated in FIG. 3 to update parameters of the neural network model NN and the channel-wise masks GS according to the training data of the new task and complete the training. In step S430, after the training on the current task is completed, and if a training needs to be performed on the next task, the learning is performed on the next task.

Specifically, for the training data of any new task, the channel-wise masks GS may restrict a part of the neural network model NN not to perform calculation. Thereby, a plurality of sub-models may be determined according to the neural network model NN and the channel-wise masks GS, and the sub-models performs feature extraction on the training data through important neurons and obtain a training feature map. The training module 1205 calculates a feature energy score according to the training feature map. Next, the training module 1205 determines a loss function according to the class label of the training data, the channel-wise masks, and the feature energy score. The loss function determines a backward propagation gradient. The training module 1205 updates the neural network model NN and the channel-wise masks GS according to the backward propagation gradient. In an embodiment, in the process of updating the parameters according to the backward propagation gradient, the channel-wise masks GS correspond to the tasks 1, 2, . . . , and t, and a channel-wise mask corresponding to at least one training task of the tasks 1, 2, . . . , and t is updated. The backward propagation gradient automatically determines the importance of the parameters in the training process. If the importance is high, the corresponding channel-wise mask is activated, and the activated channel-wise mask self-adaptively updates a part of the parameters of the neural network model NN. In other words, after the electronic device 10 has learned the tasks 1, 2, . . . , and t, the channel-wise masks GS may classify the same neural network model NN into a plurality of sub-models corresponding to the tasks 1, 2, . . . , and t.

In an embodiment of the disclosure, the training module 1205 determines a plurality of activation parameters based on a plurality of channel-wise masks GS. After the training module 1205 calculates the loss according to a plurality of activation parameters, the training module 1205 adjusts the backward propagation gradient according to the loss. The training module 1205 updates the neural network model NN and the channel-wise masks GS according to the adjusted backward propagation gradient. In an embodiment, in the process of updating the parameters according to the backward propagation gradient, the channel-wise masks GS correspond to the tasks 1, 2, . . . , and t, and the channel-wise mask corresponding to at least one training task of the tasks 1, 2, . . . , and t is updated.

In an embodiment of the disclosure, the loss function includes a cross entropy loss, a channel-wise mask polarization regularization term, and an energy loss.

In an embodiment of the disclosure, the neural network model NN includes at least one convolutional layer and at least one batch normalization layer, and each of the channel-wise masks GS includes scaling factors of the at least one batch normalization layer. In an embodiment, the dimension of the scaling factors is the same as the dimension of the convolutional layer, and the scaling factors of each batch normalization layer are associated with the corresponding convolutional kernels of the convolutional layer. In an embodiment of the disclosure, a channel-wise mask polarization regularization term is associated with the scaling factors.

In an embodiment of the disclosure, the training module 1205 putting a training image through the at least one convolutional layer to obtain an input feature map. The training module 1205 performs normalization calculation on the input feature map and the corresponding scaling factors through the at least one batch normalization layer to obtain a training feature map.

Figure 5:
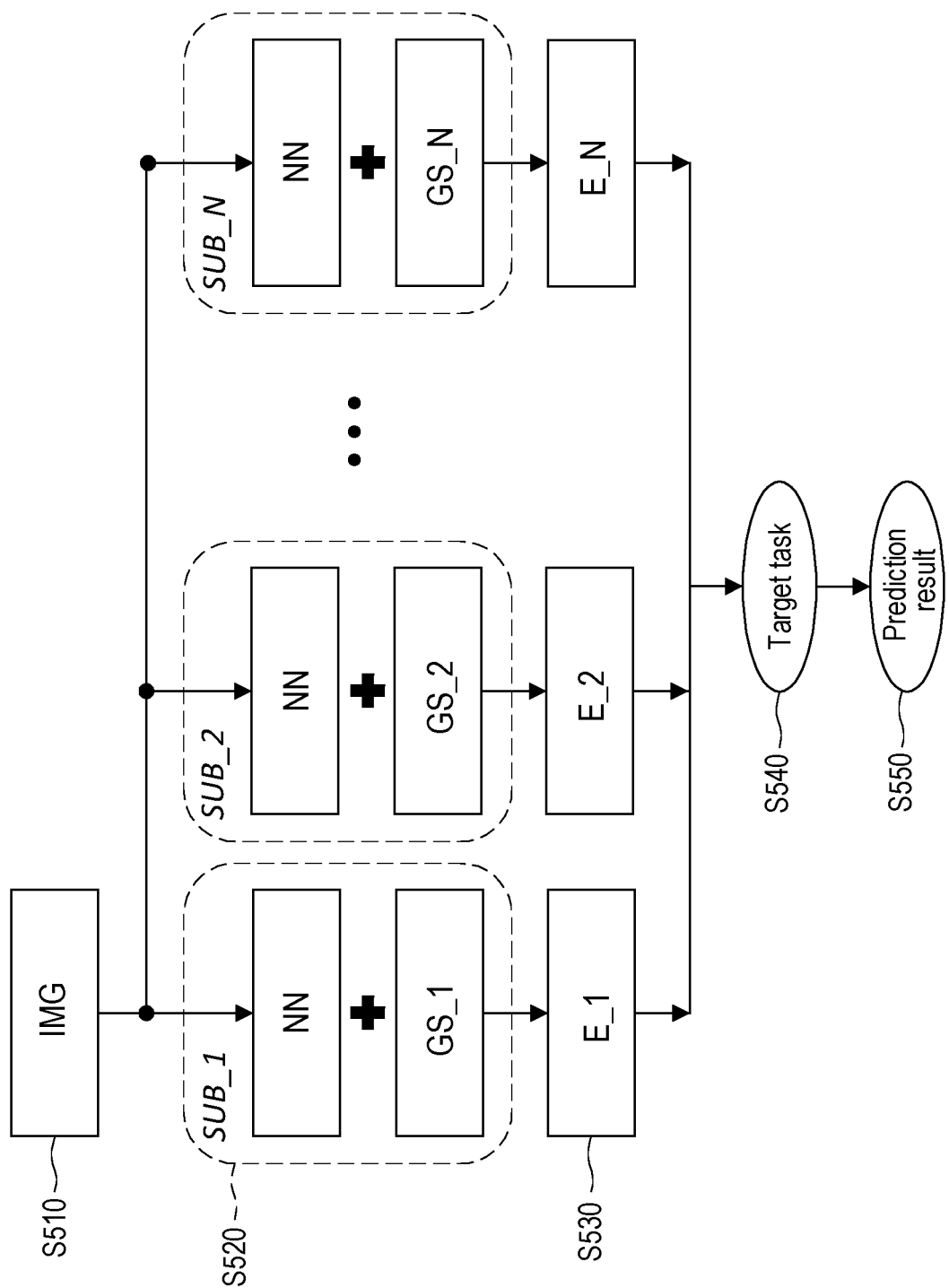
FIG. 5 is a schematic view of operating an inference module according to an embodiment of the disclosure.

FIG. 5 is a schematic view of operating the inference module 1203 according to an embodiment of the disclosure. With reference to FIG. 5, in step S510, the inference module 1203 captures the input image IMG. Specifically, the neural network model NN that has learned N tasks (N is a positive integer) correspond to N channel-wise masks GS_1, GS_2, . . . , and GS_N, and the channel-wise masks GS_1, GS_2, . . . , and GS_N respectively record that a plurality of tasks may be calculated by applying a part of the neural network model NN. With the channel-wise masks GS_1, GS_2, . . . , and GS_N and the neural network model NN, feature extraction may be determined to be performed on the input image IMG by a plurality of sub-models SUB_1, SUB_2, . . . , and SUB_N to obtain a plurality of feature maps.

In one or more embodiments of the disclosure, note that the sub-models SUB_1, SUB_2, . . . , SUB_N share the same neural network model NN. That is, the channel-wise masks GS_1, GS_2, . . . , and GS_N classify the same neural network model NN to the sub-models corresponding to the tasks.

In step S520, the inference module 1203 performs feature extraction on the input image IMG by the sub-models SUB_1, SUB_2, . . . , and SUB_N to obtain a plurality of feature maps. In step S530, the inference module 1203 converts the feature maps corresponding to the sub-models SUB_1, SUB_2, . . . , and SUB_N into a plurality of energy scores E_1, E_2, . . . , and E_N, respectively. The energy scores E_1, E_2, . . . , and E_N are scalars representing the stability of sub-models SUB_1, SUB_2, . . . , and SUB_N. In terms of energy, the lower the scalars are, the more stable the sub-models are. The energy scores E_1, E_2, ..., and E_N measure the degree of correlation between the input image IMG and sub-models, so as to achieve the effect of task-awareness. The sub-models SUB_1, SUB_2, ..., and SUB_N correspond to the tasks.

In step S540, the inference module 1203 selects a target sub-model corresponding to a target task from the sub-models SUB_1, SUB_2, ..., and SUB_N according to the energy scores E_1, E_2, ..., and E_N. The target task is one of the tasks where the training is completed, and the target task is a task of correspondingly processing the input image IMG. The target sub-model is one of the sub-models which is determined to be most related to the target task according to the energy scores E_1, E_2, ..., and E_N.

In an embodiment of the disclosure, the inference module 1203 selects one of the sub-models corresponding to the minimum value of the energy scores E_1, E_2, ..., and E_N as the target sub-model. In some embodiments, the tasks may include a first task and a second task, and the target sub-model may be the sub-model corresponding to the first task or the sub-model corresponding to the second task. In some embodiments, the target sub-model may also be one of the sub-models corresponding to the tasks.

In step S550, the inference module 1203 outputs a prediction result corresponding to the target task through the target sub-model. In an embodiment, the inference module 1203 converts the feature map corresponding to the target sub-model into a confidence score corresponding to the prediction class of the target task through a Softmax function and obtains the corresponding prediction result.

Figure 6A:
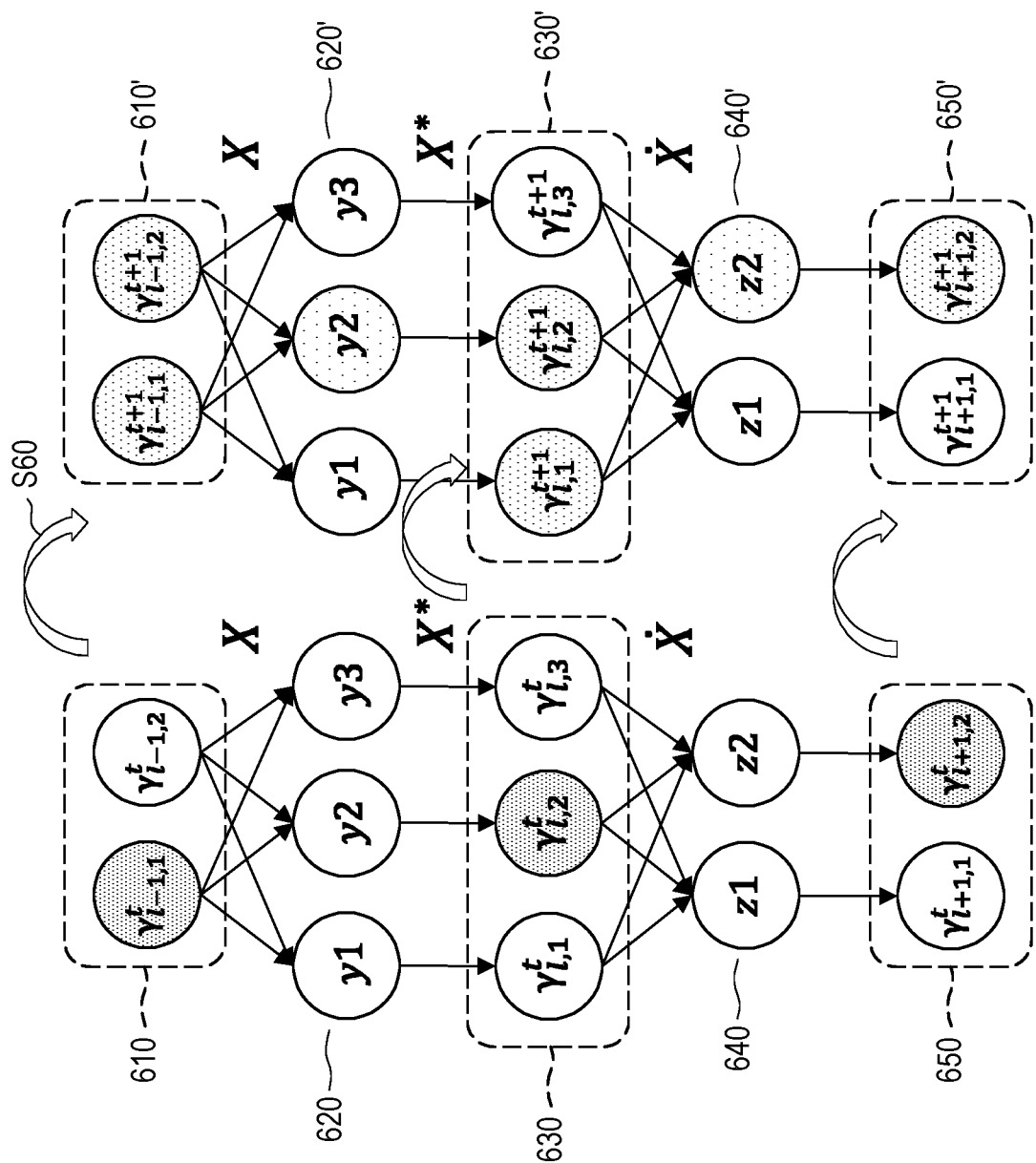
FIG. 6A is a schematic view of training a neural network model according to an embodiment of the disclosure.

FIG. 6A is a schematic view of training a neural network model according to an embodiment of the disclosure. With reference to FIG. 4 and FIG. 6A, in an embodiment of the disclosure, the neural network model includes at least one convolutional layer and at least one batch normalization layer. As shown in FIG. 6A, the neural network model NN includes batch normalization layers 610, 630, and 650 and convolutional layers 620 and 640. For instance, the neural network model NN has trained t tasks, and feature extraction is performed on the given input data $X \in R^{H \times W \times C}$ (H is the height, W is the width, and C is the number of channels) by the convolutional layer 620 to obtain the feature map $X^* \in R^{H \times W \times C}$, and normalization calculation is performed by the batch normalization layer 630 to obtain the feature map $\dot{X}$. Taking the batch normalization layer 630 as an example, the normalization calculation may be performed by the following formula (1):

$$\dot{X} = \gamma_l^t \times ((X^* - \mu_l^t)/\sigma_l^t) + \beta_l^t \quad (1)$$

wherein $\dot{X}$ is the normalized feature map, $X^*$ is the feature map obtained through the convolutional layer, $\gamma_l^t$ is the scaling factors, $\mu_l^t$ is an average value, $\sigma_l^t$ is a standard deviation, and $\beta_l^t$ is shifting factors.

In the formula (1), the variable l=1, ..., L−1, which represents the convolutional layer. L is a positive integer, the variable t represents the current task, $\mu_l^t$ is the average value of the input feature maps of different channels in the same batch, and $\sigma_l^t$ is the standard derivation of the input feature maps of different channels in the same batch. Here, the scaling factors $\gamma_l^t$ and the shifting factors $\beta_l^t$ are parameters that can be trained. In an embodiment, the initial value of $\gamma_l^t$ is set as 0.5, and the initial value of $\beta_l^t$ is set as 0. The scaling factors $\gamma_l^t$ has the function of scaling the feature maps sent by the convolutional layers.

In an embodiment of the disclosure, each of the channel-wise masks GS includes a plurality of scaling factors $\gamma_l^t$ of at least one batch normalization layer, and the scaling factors $\gamma_l^t$ are associated with a plurality of convolutional kernels of at least one convolutional layer. Specifically, the scaling factors $\gamma_l^t$ in the batch normalization layer may be applied to measure the importance of the corresponding convolution kernels in the convolutional layer. In an embodiment of the disclosure, a specific batch normalization layer is set for each task of learning. In each task, data scattering characteristics ($\mu_l^t$ and $\sigma_l^t$) of the specific task are remembered by applying the corresponding batch normalization layer, and the scaling factors $\gamma_l^t$ of the corresponding task are applied to record the locations of the convolutional kernels that are important to the target task.

Specifically, the convolution kernels of each convolution layer have the corresponding scaling factors $\gamma_l^t$ in the dimension of the number of channels C to represent the importance of the convolution kernels in the convolution layer. In an embodiment, the number of the scaling factors $\gamma_l^t$ corresponds to the number of channels of the feature map $X^*$. Since the scaling factors $\gamma_l^t$ may scale up or down the feature map $X^*$, the scaling factors $\gamma_l^t$ may serve to limit some calculations on the neural network model NN by the channel-wise masks GS. In an embodiment, if the scaling factor $\gamma_l^t$ is not equal to 0, it indicates that the feature map in the corresponding channel needs to participate in the calculation, so the feature map goes through the batch normalization layer to the next layer. On the contrary, if the scaling factor $\gamma_l^t$ is equal to 0, it indicates that the feature map in the corresponding channel is not important, and it is not necessary to put the feature map corresponding to this channel to the next layer.

That is, the scaling factor $\gamma_l^t$ may determine whether to activate neurons in the neural network model NN for a target task. Taking FIG. 6A as an example, for the current task t, the neurons corresponding to the scaling factors $\gamma_{l-1,1}^t$, $\gamma_{l,2}^t$, and $\gamma_{l+1,2}^t$ in the batch normalization layers 610, 630, and 650 are activated, and the feature map corresponding to this channel is put to the next layer.

After step S60, for the given feature map $X \in R^{H \times W \times C}$ of the new task t+1, note that the training module 1205 replaces the batch normalization layers with new batch normalization layers 610', 630', and 650'. However, convolutional layers 620' and 640' are the same as the original convolutional layers 620 and 640 to perform the steps in the training stage. As shown in FIG. 6A, for the new task t+1, the neurons corresponding to the scaling factors $\gamma_{l-1,1}^{t+1}$, $\gamma_{l-1,2}^{t+1}$, $\gamma_{l,1}^{t+1}$, $\gamma_{l,2}^{t+1}$, and $\gamma_{l+1,2}^{t+1}$ in the new batch normalization layers 610', 630', and 650' are activated, so that the feature maps corresponding to this channel are put to the next layer.

When feature extraction is performed by the training module 1205 on the training data $X \in R^{H \times W \times C}$ of the new task t+1 according to the neural network model NN and the channel-wise masks GS, a training feature map $f(X) \in R^{1 \times C'}$ may be obtained, wherein C' is the number of output classes. The training module 1205 converts the training feature map $f(X)$ into energy scores E.

The energy scores E are calculated by the following formula (2):

$$E = -\log \Sigma_{c=1}^{C'} \exp\{f(X)_c\} \quad (2)$$

wherein E is the energy scores, $f(X)_c$ is a value of the feature maps in a class, and C' is the number of classes.

Next, the training module 1205 determines a loss function $\hat{L}$ according to the class label of the training data, the channel-wise masks GS, and the energy scores E. The training module 1205 determines a backward propagation gradient according to the loss function $\hat{L}$ and updates the neural network model NN and the channel-wise mask GS corresponding to the training task according to the backward propagation gradient.

The loss function $\hat{L}$ is represented by the following formula (3):

$$\hat{L} = L_{CE} + \lambda_1 R_s(r) + \lambda_2 \text{Loss}_E \quad (3)$$

wherein $L_{CE}$ is a cross entropy loss, $R_s(r)$ is a channel-wise mask polarization regularization term, $\text{Loss}_E$ is an energy loss, and $\lambda_1$ and $\lambda_2$ are parameters.

The cross entropy loss $L_{CE}$ is determined by the class label of the training data.

The energy loss is calculated by the following formula (4):

$$\text{Loss}_E = \max(0, E_{same} - EL_{same}) + \max(0, EL_{diff} - E_{diff}) \quad (4)$$

wherein $E_{same}$ is the energy score of samples of the same task, $E_{diff}$ is the energy score of samples of different tasks, and $EL_{same}$ and $EL_{diff}$ are parameters.

The channel-wise mask polarization regularization term $R_s(r)$ is calculated by the following formula (5):

$$R_s(r) = \Sigma_{l=1}^{L} \Sigma_{c=1}^{C_l} k |r_{l,c}{}^t| - |r_{l,c}{}^t - \bar{r}|,$$
$$\bar{r} = \Sigma_{l=1}^{L} \Sigma_{c=1}^{C_l} r_{l,c}{}^t / \Sigma_{l=1}^{L} C_l \quad (5)$$

wherein $r_{l,c}{}^t$ is the scaling factors, L is the number of layers, $C_l$ is the number of channels, and k is a parameter.

The channel-wise mask polarization regularization term $R_s(r)$ in the formula (5) may be applied to reduce the number of activated neurons, wherein $|r_{l,c}{}^t|$ represents the absolute value of the scaling factors $r_{l,c}{}^t$ for each channel in each batch normalization layer, and the absolute value $|r_{l,c}{}^t|$ allows each scaling factor $r_{l,c}{}^t$ to approach 0 after training. $\bar{r}$ is the average value of the scaling factors $r_{l,c}{}^t$ of the entire neural network model. $|r_{l,c}{}^t - \bar{r}|$ drives all the scaling factors $r_{l,c}{}^t$ to increase the difference of $\bar{r}$. That is, the scaling factors $r_{l,c}{}^t$ achieve a polarizing effect, thus resulting in the remarkable difference between importance and non-importance. The parameters k, $\lambda_1$, and $\lambda_2$ of the formulas (2) and (5) may be adjusted according to different training data sets.

In the process of determining the backward propagation gradient for learning the new task t+1, the scaling factors $\gamma_l^{t+1}$ receive a gradient $g_l$ transmitted from an activation layer, and the training module 1205 determines whether a plurality of corresponding convolutional parameters are important and are to be activated according to the scaling factors $\gamma_l^{t+1}$. If the scaling factor $\gamma_l^{\leq t}$ corresponding to at least one of the t tasks where the training is already performed indicates high importance to the convolutional parameter at the same location, then $\text{act}(\gamma_l^{\leq t})$ represents that the convolutional parameter is activated by the scaling factor corresponding to at least one task. The training module 1205 adjusts the backward propagation gradient $g'_l$ according to the activation parameters act(x). The training module 1205 updates the neural network model NN and the channel-wise mask GS (the scaling factor $\gamma_l^{t+1}$) corresponding to the new task t+1 according to the adjusted backward propagation gradient $g'_l$.

The adjusted backward propagation gradient is calculated by the following formula (6):

$$g'_l = (1 - \text{act}(\gamma_l^{\leq t})) g_l, \begin{cases} \text{act}(x) = 1 \text{ if } x \neq 0 \\ \text{act}(x) = 0 \text{ if } x = 0 \end{cases} \quad (6)$$

wherein $g'_l$ is the adjusted backward propagation gradient, $g_l$ is the backward propagation gradient, $\gamma_l^{\leq t}$ is a cumulative maximum value of the scaling factors of different tasks corresponding to convolutional parameters at the same location, and $\text{act}(\gamma_l^{\leq t})$ corresponds to the activation parameters determined by the cumulative maximum value $\gamma_l^{\leq t}$.

Figure 6B:
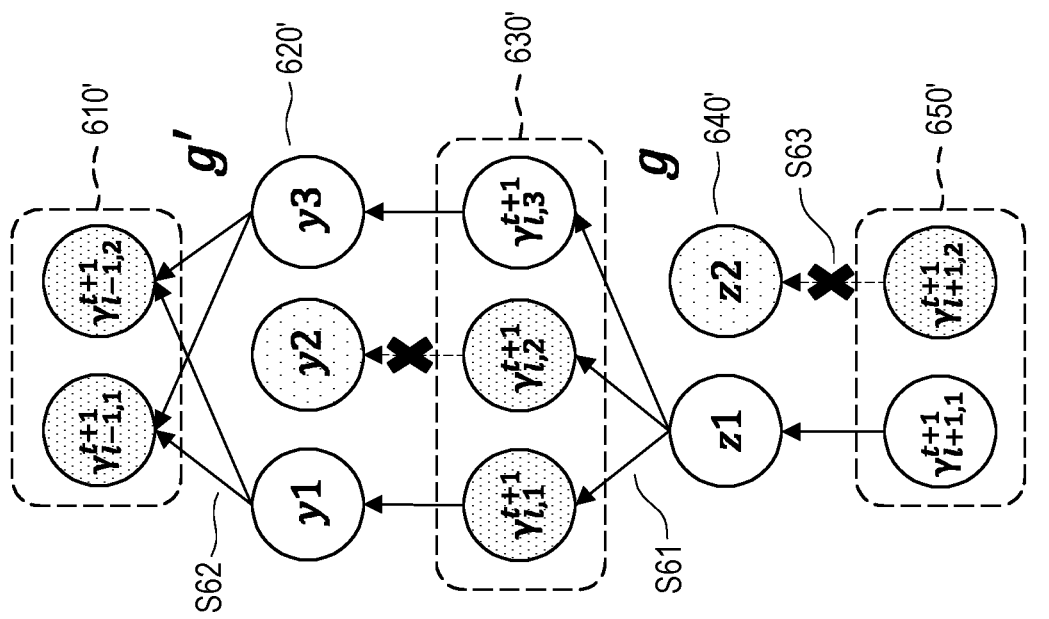
FIG. 6B is a schematic view of updating the neural network model and the channel-wise mask corresponding to a task according to the backward propagation gradient in an embodiment of the disclosure.

FIG. 6B is a schematic view of updating the neural network model NN and a channel-wise mask GS corresponding to a task according to the backward propagation gradient in an embodiment of the disclosure. With reference to FIG. 6B, the batch normalization layer 630' is taken as an example; in step S61, the batch normalization layer 630' obtains the backward propagation gradient g transmitted back by a neuron z1. In step S62, the training module 1205 determines a plurality of activation parameters act(x) according to the scaling factors $\gamma_l^{t+1}$ of the batch normalization layer 630' and adjusts the backward propagation gradient g and updates the scaling factors $\gamma_l^{t+1}$ of the batch normalization layer 610' and parameters of neurons y1 and y3 according to the adjusted backward propagation gradient g'.

When performing the backward propagation gradient for learning the new task t+1, the training module 1205 records the location of the activated scaling factors $\gamma_l^{t+1}$ for the t tasks on which the training has been performed. If the parameter of the corresponding convolutional layer is very important to a previous task, it is not expected to modify the parameter by the gradient corresponding to the new task; therefore, in the process of performing the backward propagation gradient for the new task, the important convolutional neurons are protected from being modified by the new task, which should however not pose any limitation to whether the channel-wise masks GS corresponding to the new task activate the neurons important to the previous task. Therefore, the convolutional kernels whose parameters are of high importance may be effectively used repeatedly by a plurality of tasks. For instance, the neurons y2 and z2 shown in FIG. 6B are the preserved convolutional neurons, and thus in the backward propagation gradient process of step S63, the parameters of the neurons y2 and z2 are not modified.

Note that the embodiments described in FIG. 6A and FIG. 6B are preferred embodiments provided in the disclosure; through the scaling factors of the batch normalization layer, the effect of identifying the target task from the tasks in a self-adaptive manner by the channel-wise masks corresponding to the tasks may be accomplished. However, without departing from the spirit and scope of the disclosure, the channel-wise masks GS are not limited to being implemented through the batch normalization layer. In some embodiments, the channel-wise masks GS may also be implemented by performing element-wise multiplication on the feature maps through a plurality of importance factors.

Figure 7:
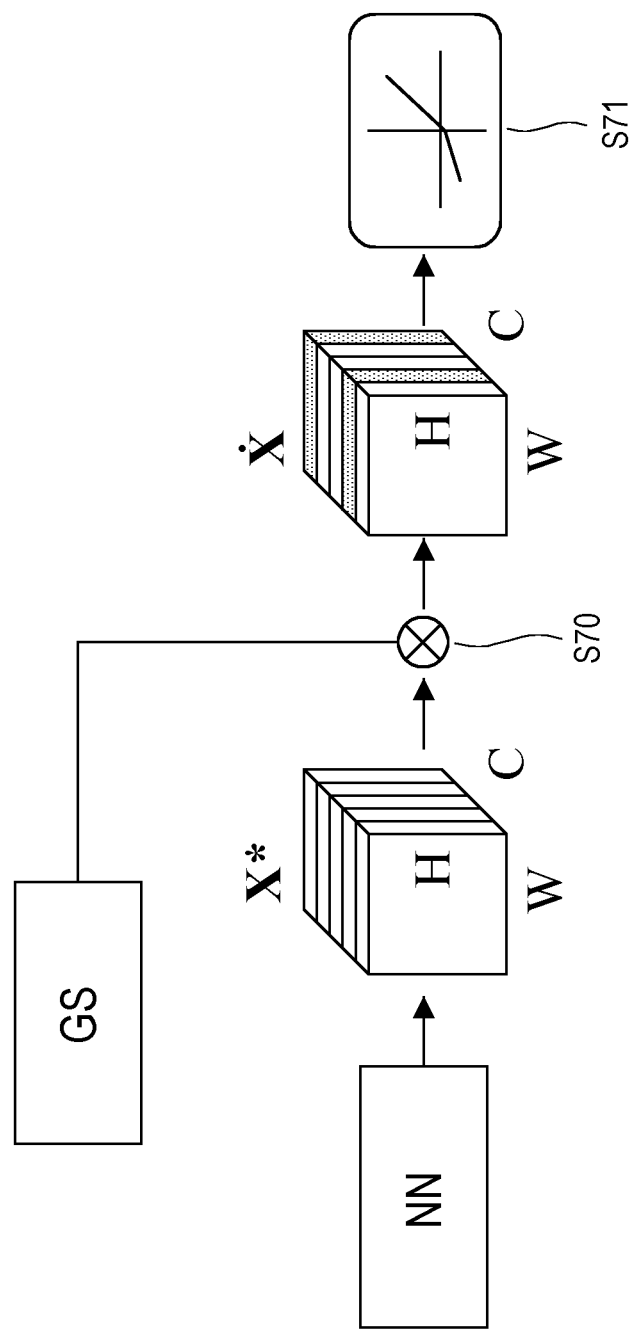
FIG. 7 is a schematic view of operating the neural network model and the channel-wise masks corresponding to the tasks according to another embodiment of the disclosure.

FIG. 7 is a schematic view of operating the neural network model and the channel-wise masks corresponding to the tasks according to another embodiment of the disclosure. In an embodiment of the disclosure, each of the channel-wise masks GS includes a plurality of importance factors. The inference module 1203 puts the input image through the neural network model NN to obtain an output feature map. In step S70, the inference module 1203 performs an element-wise multiplication on the output feature map and the importance factors to obtain the feature maps. In step S71, the inference module 1203 applies an activation function to the feature maps to obtain a prediction result.

The importance factors are calculated by the following formula (7):

$$IF_l^i = \frac{1}{1 + e^{k\alpha_l^i}} \quad (8)$$

wherein $IF_l^t$ is the importance factors, $x_l^t$ is the output feature map, and k is a parameter.

In an embodiment of the disclosure, the loss function includes an importance factor regularization term, and the importance factor regularization term is associated with the importance factors.

In another embodiment of the disclosure, the adjusted backward propagation gradient is calculated by the following formula (8):

$$g'_l = (1 - IF_l^{=t}) g_l \qquad (8)$$

Figure 8:
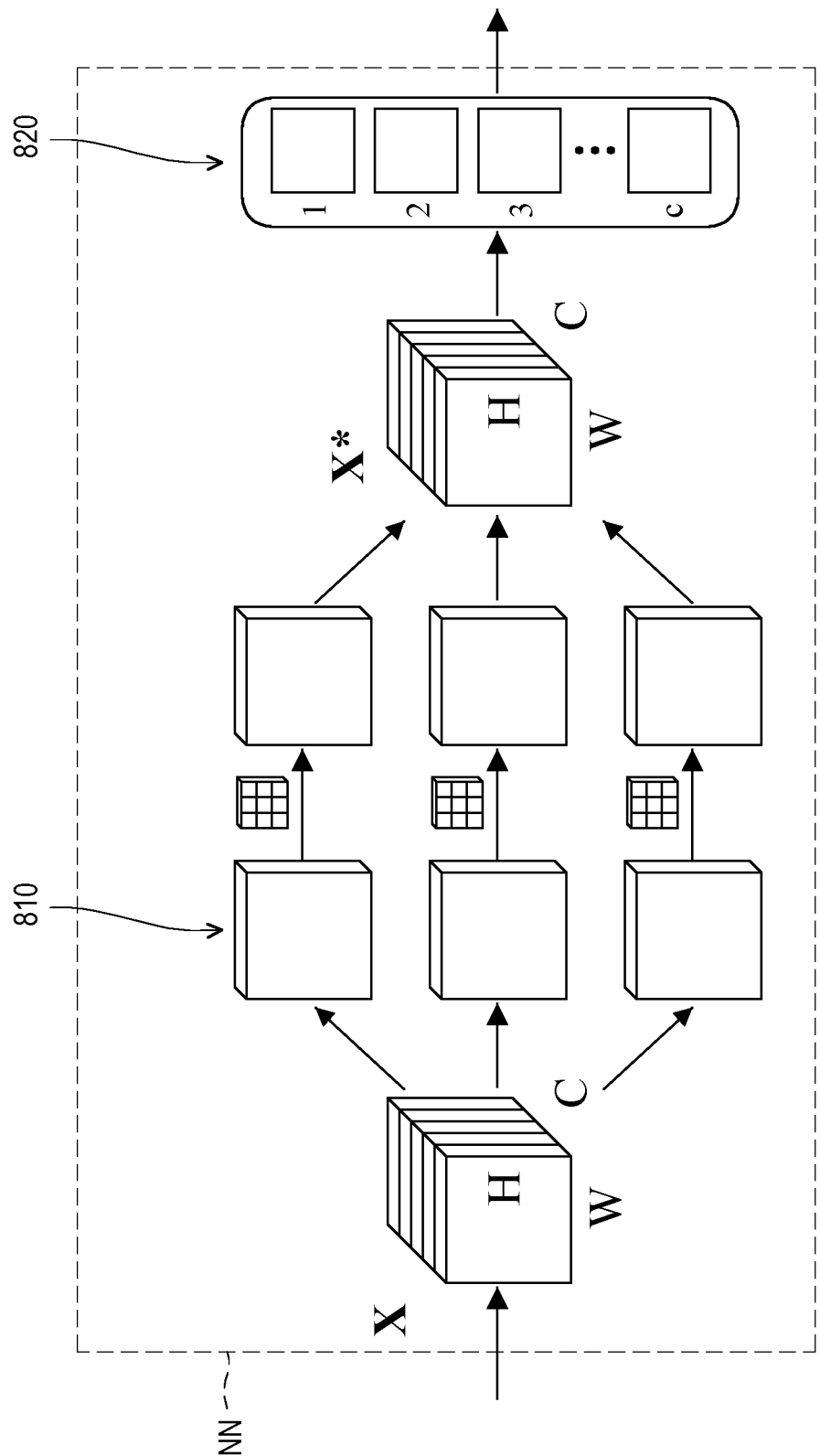
FIG. 8 is a schematic view of a neural network model according to another embodiment of the disclosure.

Here, $g'_l$ is the adjusted backward propagation gradient, $g_l$ is the backward propagation gradient, and $IF_l^{=t}$ is the maximum value of the importance factors. FIG. 8 is a schematic view of the neural network model NN according to another embodiment of the disclosure. The neural network model NN includes a convolutional layer 810 and a batch normalization layer 820. With reference to FIG. 7 together, the importance factors are associated with a plurality of convolutional kernels of the convolutional layer 810. In an embodiment, the neural network model NN may be a convolutional neural network architecture, which is, for instance, a neural network architecture of ResNet, VGG, or MobileNet-v2. In the embodiments depicted in FIG. 7 and FIG. 8, note that the channel-wise masks GS may perform the element-wise multiplication by a plurality of importance factors to achieve the important parameter screening for the neurons of the convolutional layer 810, which is limited to the batch normalization layer 820 of the neural network model NN.

Figure 9:
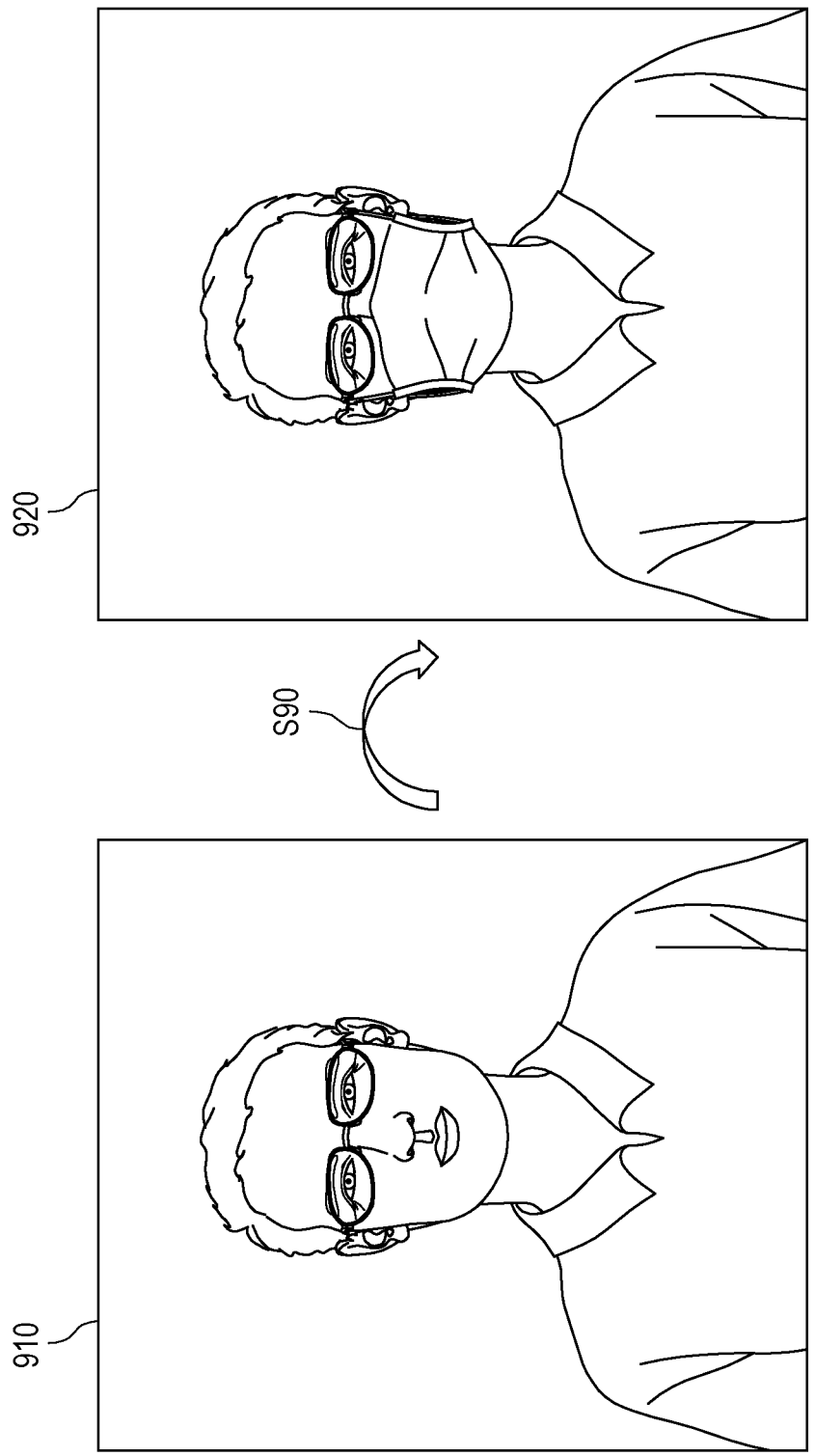
FIG. 9 is a schematic view of training data associated with a plurality of tasks according to an embodiment of the disclosure.

FIG. 9 is a schematic view of training data associated with a plurality of tasks according to an embodiment of the disclosure. In an embodiment of the disclosure, the machine learning method may be applied to enhance the ability of recognizing a human face wearing a mask in response to access control management. For instance, an image 910 of a human face wearing a mask and the corresponding class label may serve as the first task for training. Next, in step S90, another image 920 of a human face wearing a mask serves as a new task for training. In this example, the machine learning method provided in one or more embodiments of the disclosure may treat the dataset of the new image 920 of the human face wearing the mask as the new task without accessing or saving the data of the previous task. Since the channel-wise masks updated in the new task may select convolutional neurons that are important to the new task through training, and the new task permits to use the parameters of the previous task, the task of learning the recognition of the image of the human face wearing the mask may apply the features learned in the previous task in association with the eyes, the eyebrows, and the forehead that are not covered by the mask. As for parameters that are not important in the new task, such as the mouth and the nose, the relevant convolutional neurons in the first task are not activated in the new task. Besides, the convolutional neurons that are not important to the previous task model are applied to learn the detailed features of the human face wearing the mask, such as the shadow area of the protruding nose after wearing the mask, the outline or profile of a projection surface of the human face blocked by the mask, and so on.

In an embodiment of the disclosure, the machine learning method may be configured to search for similar merchandises. For instance, the first task of learning is to identify clothes and accessories for spring. Then, by the time of seasonal wardrobe change, the new task of learning is to identify clothes and accessories for winter, and the training for the new task is performed with images and data of the winter clothes and accessories because the training of the previous task model already includes general features of clothes. Since the channel-wise masks updated in the new task may select convolutional neurons that are important to the new task through training, and the new task permits to use the parameters of the previous task, the task of learning the identification of the images of winter clothes and accessories may apply the detailed features (e.g., collars, sleeves, buttons, etc.) learned in the previous task, so as to improve a re-utilization rate and enhance the computing performance of the electronic device.

In an embodiment of the disclosure, the machine learning method may be configured for detecting defects of elements installed on surfaces of printed circuit boards manufactured by smart factories. For instance, the first task of learning is to distinguish the defects of resistors of the first model, which contains images of two classes, i.e., normal and abnormal. When the printed circuit board needs to be additionally equipped with a resistor of the second model, since the training of the neural network model corresponding to the first task has included features of the resistors, such as appearances and defects, the channel-wise masks containing the images and data of the resistors of the second model updated in the second task may select the convolutional neurons that are important to the second task from the first task, such as the appearances of the elements and some common offset defects. In other words, in the new task, the convolutional kernels that are important to the previous task may be repeatedly used, and the convolutional kernels that are not important to the previous task are applied to learn the features that are missing in the first task. As such, the previous parameters may be effectively used, and the features of defects that are important to the new task may be learned.

To sum up, one or more embodiments of the disclosure provide the task-aware continual learning mechanism based on energy scores, the feature maps corresponding to a plurality of tasks are classified by the channel-wise masks in the neural network model to determine the sub-models, the neural network model together with the channel-wise masks corresponding to the tasks is allowed to automatically select, in a cross-task manner, the convolutional parameters important to other previous tasks, and the convolutional parameters that have not been used by the previous tasks are applied to learn the new task and knowledge. Finally, the loss function is applied to determine the backward propagation gradient to optimize a new task, so that the neural network model may have an improved re-utilization rate. Thereby, the neural network model is allowed to keep more neurons for learning the next task, and important parameters in the sub-models may be preserved, so as to further effectively prevent catastrophic forgetting.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A machine learning method for continual learning, comprising:
   capturing an input image;
   performing feature extraction on the input image by a plurality of sub-models to obtain a plurality of feature maps, wherein the sub-models correspond to a plurality of tasks, and the sub-models are determined by a neural network model and a plurality of channel-wise masks;
converting the feature maps into a plurality of energy scores;
selecting a target sub-model corresponding to a target task of the tasks from the sub-models according to the energy scores; and
outputting a prediction result corresponding to the target task by the target sub-model,
wherein the machine learning method further comprises:
receiving training data associated with the tasks, wherein the training data comprise a training image and a class label corresponding to the training image;
performing the feature extraction on the training image according to the neural network model and the channel-wise masks to obtain a training feature map;
converting the training feature map into a feature energy score;
determining a loss function according to the class label, the channel-wise masks, and the feature energy score;
determining a backward propagation gradient according to the loss function; and
updating the neural network model and the channel-wise masks according to the backward propagation gradient, wherein the channel-wise masks correspond to the tasks, and a channel-wise mask of the channel-wise masks corresponding to at least one training task of the tasks is updated.

2. The machine learning method according to claim 1, wherein the neural network model comprises at least one convolutional layer and at least one batch normalization layer.

3. The machine learning method according to claim 2, wherein each of the channel-wise masks comprises a plurality of scaling factors of the at least one batch normalization layer, and the scaling factors are associated with a plurality of convolutional kernels of the at least one convolutional layer, wherein the step of performing the feature extraction on the input image by the sub-models to obtain the feature maps comprises:
putting the input image through the at least one convolutional layer to obtain an input feature map; and
performing normalization calculation on the input feature map and the scaling factors of each of the channel-wise masks through at least one batch normalization layer to obtain the feature maps.

4. The machine learning method according to claim 3, wherein the normalization calculation is performed by a following formula:

$$\dot{X} = \gamma_l^t \times ((X^* - \mu_l^t)/\sigma_l^t) + \beta_l^t$$

wherein $\dot{X}$ is the feature maps, $X^*$ is the input feature map, $\gamma_l^t$ is the scaling factors, $\mu_l^t$ is an average value, $\sigma_l^t$ is a standard deviation, and $\beta_l^t$ is a shifting factor.

5. The machine learning method according to claim 1, wherein the step of converting the feature maps into the energy scores is calculated by a following formula:

$$E = -\log \sum_{c=1}^{C'} \exp\{f(X)_c\}$$

wherein E is the energy scores, $f(X)_c$ is a value of the feature maps in a class c, and C' is a number of classes.

6. The machine learning method according to claim 1, wherein the step of selecting the target sub-model corresponding to the target task of the tasks from the sub-models according to the energy scores comprises:
selecting a sub-model corresponding to a minimum value of the energy scores as the target sub-model.

7. The machine learning method according to claim 1, wherein each of the channel-wise masks comprises a plurality of importance factors, and the step of performing the feature extraction on the input image by the sub-models to obtain the feature maps comprises:
putting the input image through the neural network model to obtain an output feature map;
performing an element-wise multiplication on the output feature map and the importance factors of each of the channel-wise masks to obtain the feature maps.

8. The machine learning method according to claim 7, wherein the importance factors are calculated by a following formula:

$$IF_l^t = \frac{1}{1 + e^{kx_l^t}}$$

wherein $IF_l^t$ is the importance factors, $x_l^t$ is the output feature map, and k is a parameter.

9. The machine learning method according to claim 1, wherein the neural network model comprises at least one convolutional layer and at least one batch normalization layer, each of the channel-wise masks comprises a plurality of scaling factors of the at least one batch normalization layer, and the scaling factors are associated with a plurality of convolutional kernels of the at least one convolutional layer, wherein the step of performing the feature extraction on the training image according to the neural network model and the channel-wise masks to obtain the training feature map comprises:
putting the training image through the at least one convolutional layer to obtain an input feature map; and
performing normalization calculation on the input feature map and the scaling factors through the at least one batch normalization layer to obtain the training feature map.

10. The machine learning method according to claim 9, wherein the loss function comprises a linear combination of:
a cross entropy loss;
a channel-wise mask polarization regularization term; and
an energy loss, wherein
the channel-wise mask polarization regularization term is associated with the scaling factors, and
the energy loss is associated with the feature energy score.

11. The machine learning method according to claim 10, wherein the channel-wise mask polarization regularization term is associated with the scaling factors.

12. The machine learning method according to claim 11, wherein the channel-wise mask polarization regularization term is calculated by a following formula:

$$R_s(r) = \sum_{l=1}^{L} \sum_{c=1}^{C_l} k|r_{l,c}^t| - |r_{l,c}^t - \bar{r}|,$$
$$\bar{r} = \sum_{l=1}^{L} \sum_{c=1}^{C_l} r_{l,c}^t / \sum_{l=1}^{L} C_l$$

wherein $R_s(r)$ is the channel-wise mask polarization regularization term, $r_{l,c}^t$ is the scaling factors, L a number of layers, $C_l$ is a number of channels, and k is a parameter.

13. The machine learning method according to claim 10, wherein the energy loss is calculated by a following formula:

$$Loss_E = \max(0, E_{same} - EL_{same}) + \max(0, EL_{diff} - E_{diff})$$

wherein Loss$_E$ is the energy loss, E$_{same}$ is the energy score of samples of the same task, E$_{diff}$ is the energy score of samples of different tasks, and EL$_{same}$ and EL$_{diff}$ are parameters.

14. The machine learning method according to claim 9, wherein the step of updating the neural network model and the channel-wise masks according to the backward propagation gradient comprises:
   determining a plurality of activation parameters according to the channel-wise masks;
   adjusting the backward propagation gradient as an adjusted backward propagation gradient according to the activation parameters; and
   updating the neural network model and the channel-wise masks according to the adjusted backward propagation gradient.

15. The machine learning method according to claim 14, wherein the adjusted backward propagation gradient is calculated by a following formula:

$$g'_l = (1 - act(\gamma_l^{\leq t}))g_l, \begin{cases} act(x) = 1 \text{ if } x \neq 0 \\ act(x) = 0 \text{ if } x = 0 \end{cases}$$

wherein $g'_l$ is the adjusted backward propagation gradient, $g_l$ is the backward propagation gradient, $\gamma_l^{\leq t}$ is a cumulative maximum value of the scaling factors of task 1 to task t corresponding to convolutional parameters at a same location, and $act(\gamma_l^{\leq t})$ corresponds to the activation parameters determined by the cumulative maximum value $\gamma_l^{\leq t}$.

16. The machine learning method according to claim 1, wherein each of the channel-wise masks comprises a plurality of importance factors, the loss function comprises an importance factor regularization term, and the importance factor regularization term is associated with the importance factors.

17. The machine learning method according to claim 16, wherein the step of updating the neural network model and the channel-wise masks according to the backward propagation gradient comprises:
   determining a plurality of activation parameters according to the channel-wise masks;
   adjusting the backward propagation gradient as an adjusted backward propagation gradient according to the activation parameters; and
   updating the neural network model and the channel-wise masks according to the adjusted backward propagation gradient, wherein the adjusted backward propagation gradient is calculated by a following formula:

$$g'_l = (1 - IF_l^{\leq t})g_l$$

wherein $g'_l$ is the adjusted backward propagation gradient, $g_l$ is the backward propagation gradient, and $IF_l^{\leq t}$ is a cumulative maximum value of the importance factors of task 1 to task t corresponding to convolutional parameters at a same position.

18. An electronic device for continual learning, comprising:
   a storage medium, storing a plurality of modules; and
   a processor, coupled to the storage medium and executes the modules, wherein the modules comprise:
      an image capturing module, capturing an input image;
      an inference module, performing feature extraction on the input image by a plurality of sub-models to obtain a plurality of feature maps, wherein the sub-models correspond to a plurality of tasks, the sub-models are determined by a neural network model and a plurality of channel-wise masks, the feature maps are converted into a plurality of energy scores, a target sub-model corresponding to a target task of the tasks is selected from the sub-models according to the energy scores, and a prediction result corresponding to the target task is output by the target sub-model; and
      a training module, receiving training data associated with the tasks, wherein the training data comprise a training image and a class label corresponding to the training image; performing the feature extraction on the training image according to the neural network model and the channel-wise masks to obtain a training feature map; converting the training feature map into a feature energy score; determining a loss function according to the class label, the channel-wise masks, and the feature energy score; determining a backward propagation gradient according to the loss function; and updating the neural network model and the channel-wise masks according to the backward propagation gradient, wherein the channel-wise masks correspond to the tasks, and a channel-wise mask of the channel-wise masks corresponding to at least one training task of the tasks is updated.

* * * * *